Patented July 11, 1944

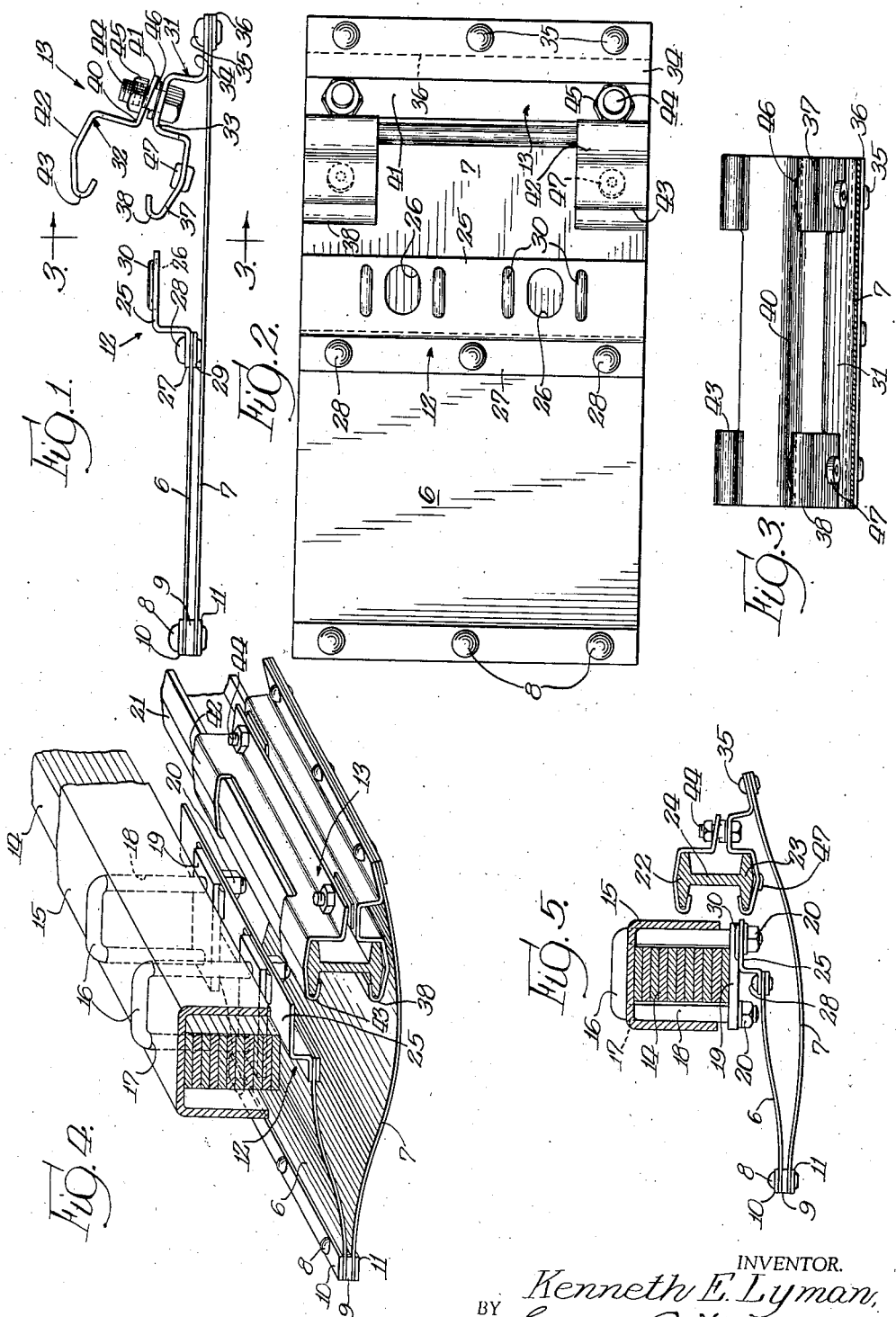

2,353,574

UNITED STATES PATENT OFFICE 2,353,574

STABILIZER

Kenneth E. Lyman, Lake Forest, Ill., assignor to Edwin Bagnall, Chicago, Ill.

Application April 19, 1941, Serial No. 389,279

25 Claims. (Cl. 267—67)

The invention relates generally to a stabilizer for a spring supported body and more particularly to a stabilizer for vehicles.

A general object of the invention is to provide a stabilizer which is an improvement upon the stabilizer disclosed and claimed in the copending application of Edwin Bagnall, Serial No. 364,509, filed November 6, 1940.

Among the more particular objects of the invention is the provision of a stabilizer having a new and improved construction providing greater clearance for spring action when needed without affecting normal road clearance.

Another object is to provide, in a stabilizer of the kind described, a new and improved leaf element and a new and improved means for attaching the fulcrum end thereof.

A further object is to provide a stabilizer of the character described having a first fulcrum point about which the stabilizer flexes during normal flexing of the spring and a second fulcrum point which comes into play with abnormal flexing of the spring.

Still another object is to provide a stabilizer of the kind described particularly adapted for application to present day automotive vehicles having transverse springs disposed outwardly beyond the respective axles with which they are associated.

Still another object of the invention is the provision in a stabilizer having leaf elements joined at a common end of a spacer strip interposed between the elements to prevent the wedging between the elements of foreign particles that would set up high localized stresses.

Other objects and advantages will become apparent from the following detailed description taken in connection with the accompanying drawing, in which:

Fig. 1 is a side elevational view of a stabilizer embodying the features of this invention, shown in its normal or unapplied position.

Fig. 2 is a top plan view of the stabilizer shown in Fig. 1.

Fig. 3 is a transverse sectional view taken approximately along the line 3—3 of Fig. 1.

Fig. 4 is an isometric view showing the stabilizer of Fig. 1 applied to the vehicle having a transverse spring.

Fig. 5 is a side elevational view showing the action of the stabilizer when the spring is abnormally flexed.

The stabilizer, as disclosed herein for exemplary purposes, is particularly adapted for use on vehicles having an axle member extending between the wheels and a transverse frame member or spring and, more particularly still, for vehicles in which the transverse member or spring is displaced longitudinally of the vehicle with respect to the axle. Such relative transverse member or spring and axle constructions are found, among others, on the present day Ford and Mercury. While the stabilizer will hereinafter be described as applied to such a relative spring and axle construction, it is not intended that the invention is to be limited to the specific construction disclosed. On the contrary, it is intended to cover all uses and modifications or alternative constructions falling within the scope and spirit of the invention as defined in the appended claims.

The stabilizer comprises a pair of leaf elements 6 and 7 rigidly secured together at one of their ends by a plurality of rivets 8, and in the normal unapplied position of the stabilizer, shown in Fig. 1, extending generally parallel with one another. The elements 6 and 7 are of a high quality resilient metal, preferably spring steel, and each is made relatively thin so as to be readily flexible in a direction normal to its plane. At the same time, each element is made comparatively wide so as to offer tremendous resistance to bending moments in the plane of the element and above all to resist a shearing force between the elements.

In order to prevent dirt or other foreign particles from being trapped between the elements 6 and 7 at their point of engagement, and thus contributing to excessive wear or, more particularly, to the setting up of high local stresses, the elements 6 and 7 are preferably separated by a spacer strip 9 interposed between the elements. In addition, reinforcing strips 10 and 11 are placed on the outside of the elements underneath the heads of the rivets 8 in order further to strengthen and make more rigid the connection between the elements 6 and 7. The spacer strip 9 extends the full width of the elements and itself has a width slightly greater than necessary to accommodate the rivets 8, such width as herein shown being approximately five-eighths of an inch. The thickness of the strip should be such as will prevent foreign particles from being trapped, and such as will permit foreign particles momentarily trapped to work free without having the thickness so great as to give rise to an undesirably large force couple between the elements 6 and 7. A strip having a thickness of one-eighth of an inch has been found to be desirable. Reinforcing strips 10 and 11 are of substantially the same length, width and thickness as the strip 9. These strips, in addition to strengthening and making more rigid the connection between the elements 6 and 7, also serve to produce a frictional resistance to shear between the elements, in order to remove part of the load from the rivets 8.

The elements 6 and 7 are not only made comparatively wide, but are also made wide and as short as possible, in order to provide resistance to twisting of the elements relative to their common plane. By way of example, the thickness of the elements may be in the order of one-thirty-second of an inch, while the width of the elements is in the order of six inches. The element 6 is approximately five and one-half inches in length, while the element 7 is, for a purpose which will presently be made known, approximately twice as long as the element 6. At its remaining end the element 6 carries means, generally designated 12, for attachment to the frame of a vehicle to which the stabilizer is applied, and the element 7 carries at its remaining end a means generally designated 13, for attachment to the axle of the vehicle.

As previously stated, the stabilizer here disclosed is particularly adapted for use on a vehicle having a transverse spring, and, moreover, one in which the spring is displaced longitudinally of the vehicle with respect to the axle. Typical of such relative spring and axle construction is the front spring structure of a present day Ford. This is illustrated in Fig. 4 and comprises a transversely extending spring 14 which is received within a channel shaped transverse frame member 15 opening downwardly. The spring 14 is secured in the channel member 15 by U-bolts 16 which overlie the channel member 15 and extend downwardly through holes 17 cut in the frame member 15, with their legs 18 lying between the spring 14 and the sides of the channel member 15 which is made sufficiently wider than the spring to accommodate the legs of the U-bolts. Cross clips 19 are applied over the ends of the U-bolts 16 and are retained by nuts 20 to secure the spring firmly in the frame member 15. The spring is attached in conventional manner at its ends by shackles (not shown) to the axle 21 which is spaced laterally with respect to the spring 14, and, in the case of a Ford front axle, is spaced rearwardly of the spring so that the vehicle has a longer spring base than it has wheel base. The axle 21 in cross section has generally the shape of a conventional I-beam with conventional top and bottom flanges 22 and 23, respectively, and a connecting web 24.

The stabilizer, as best seen in Fig. 4, is applied to the vehicle under a slight tension, that is, the leaf elements 6 and 7 must, in the present instance, be separated in order to be applied to the vehicle. It is apparent, therefore, that the stabilizer does not support any portion of the weight of the vehicle and does, therefore, not act in the capacity of a spring, in fact, it serves slightly to preload the spring 14. Also, as seen in Fig. 4, the stabilizer is applied with the common or rigidly connected ends of the leaf elements extending forwardly.

The means 12 carried by the element 6 for attachment to the frame of the vehicle is designed to give maximum rigidity to the connection and at the same time be economically manufactured and easily applied. To that end, the means 12 takes the form of a bar or plate 25 provided with spaced apertures 26 for the reception of one leg 18 of each of the U-bolts 16. Forming a part of the plate 25 and extending generally parallel with it but in the opposite direction is a flange portion 27 offset downwardly, as viewed in Fig. 1, from the main portion of the plate 25. The flange portion 27 is secured to the end of the element 6 by means such as a plurality of rivets 28. Here again there preferably is placed on the face of the element 6 opposite the flange portion 27 a reinforcing and strengthening strip 29. The flange 27 is offset downwardly from the main portion of the plate 25 to provide the necessary clearance for the ends of the forward legs of the U-bolts 16, inasmuch as the plate is secured to rearward legs of the U-bolts.

In order that there may not be any displacement of the plate 25 lengthwise of the spring, that is, transversely of the vehicle, each aperture 26 in the plate is flanked by a pair of beads 30 which preferably are formed simply by pressing the same out of the plate 25. The spacing of the beads for each aperture is such that a cross strip 19 is just received therebetween, and thus serve to retain the plate firmly against movement relative to the frame 15.

It is a feature of this invention that the leaf element 7 is so constructed and that the attaching means 13 therefor is so constructed that ample clearance is provided for the ends of the U-bolts 16 regardless of the extent to which the spring 14 may be flexed under extreme conditions. To that end, the element 7 is made of such length that it extends underneath and rearwardly beyond the axle 21 with the means 13 then extending forwardly to grip the axle 21. The means 13 comprises a double jawed clamp, one jaw 31 of which is secured to the end of the element 7, and the other jaw 32 of which is carried adjustably and removably on the first jaw. The jaw 31 is formed by a plate of the width of the element 7 having a main portion 33, which is approximately U-shaped in cross section, and a flange portion 34, by means of which the jaw is attached to the element 7. A plurality of rivets 35 passing through the flange portion 34 secure the jaw 31 rigidly to the element 7, a reinforcing strip 36 being again applied to the face of the element 7 opposite the flange 34. Extending in the opposite direction from the U-shaped main portion 33 are a pair of fingers 37, each terminating in a hook 38 for engagement with the forward edge of the bottom flange 23 of the axle 21, as clearly seen in Figs. 4 and 5. As best seen in Fig. 1, the jaw 31 does not extend exactly parallel with the element 7, but makes a small angle therewith.

Jaw 32 is in the main composed of an angle plate 40 having a flange portion 41 extending in one direction and a pair of fingers 42 extending in the opposite direction, and each terminating in a hook 43 adapted for engagement over the forward edge of the top flange 22 of the axle 21, as clearly seen in Fig. 4. The base of the U-shaped main portion 33 of the jaw 31 and the flange 41 of the jaw 32 each is formed with registering holes through which bolts 44 project, and by means of which and the nut 45 carried thereby the jaws are drawn into tight clamping relationship with respect to the axle 21. In order that this clamping of the axle by the jaws may be as rigid as possible and wholly free of play, each of the fingers 37 and 42 is, as best seen in Fig. 1, provided with a slight bend intermediate its ends so as to conform to the sloping surfaces of the flanges 22 and 23 of the axle 21. In this connection, the angle between the angle plate 40 and its flange 41 is not precisely a right angle but slightly greater than a right angle, so that when the jaws are drawn together the flange 41 will form less than a right angle with the bolts 44 and thus serve to lock the nuts 45 and obviate the necessity of lock washers. To facilitate the attachment of the stabilizer, there is applied to each bolt 44 a speed nut or washer 46 which serves to retain the bolts 44 in the jaw 31 the same as if they were studs rigid with the jaw.

As previously stated, it is a feature of this invention that the stabilizer is so constructed as to provide ample clearance for the spring 14 and particularly the projecting lower ends of the U-bolts 16 under all conditions of operation including extreme flexing of the spring 14. To that end also, as previously stated, the jaw 31 does not extend strictly parallel with the element 7 but in the normal or unapplied condition of the stabilizer projects at a slight angle to the element. It is believed apparent that when the stabilizer is applied to the axle the attaching means will of necessity assume a substantially horizontal position with the result that the flange 34 will now be disposed at a slight angle with respect to the horizontal, as best seen in Fig. 4, and will thus tend to cause the thus partially applied stabilizer to extend forwardly and slightly downwardly. In order to enhance this flexing effect of the flange 34, the flange is made wider than would be necessary merely to accommodate the rivets 35, and is then riveted near its free edge, thereby lengthening the moment arm tending to effect the flexing of the element 7.

In order to apply the means 12 to the U-bolts 16, the elements 6 and 7 are spread and, as previously stated, are thus placed under a slight tension preloading the spring 14. Such spreading of the elements, and particularly since the leaf 6 is the shorter, will raise the common end of the elements and thus cause the elements to assume the flexed positions shown in Fig. 4, in which the element 7 bears against the fingers 37. To avoid wear, as well as undesirable noises, there is secured in each of the fingers 37 a rubber nub 47.

The proportions of the elements 6 and 7 are such that for the normal flexings of the spring 14 the element 7 remains in contact with the rubber nubs 47, the relative approach or separation of the frame member 15 and axle 21 being taken care of by flexing of the element 6, movement of the free common end of the elements, and the element 7 between its free end and its point of engagement with the fingers 37. A major part of the flexing under these conditions takes place in the element 7 along a line just slightly in advance of the point of contact with the fingers 37. When, however, the spring 14 is abnormally flexed and the frame member 15 and the axle 21 approach the relative positions shown in Fig. 5, a second pivot point comes into operation and provides the additional clearance necessary for the ends of the U-bolts 16. As the frame member 15 and the axle 21 approach the position shown in Fig. 5, two forces come in play to cause the stabilizer to provide the additional clearance. First, as the element 6 flattens out it, of course, lengthens slightly, and thus tends to act as a strut tending to force the free end of the stabilizer downwardly. A second and more important force is that produced by the position of the attaching means 13, particularly the flange 34 which tends to direct the entire stabilizer downwardly and forwardly. With the attaching means 12 and 13 now brought to the same relative position which they have when the stabilizer is unapplied or, in other words, with the attaching means 12 no longer raised above the top of the attaching means 13, the superior and counteracting effect of such spacing is removed and the effect of the position of the attaching means 13 comes into play, thereby causing the element 7 to move away from the jaws 31 and thus provide the necessary clearance for the ends of the U-bolts 16, as clearly seen in Fig. 5.

Stated another way, when the superior and counteracting effect of having the attaching means 12 raised above the attaching means 13 is removed, the flange 34 of the attaching means 13 tends to cause the element 7 to extend parallel with the flange, namely, downwardly and forwardly, thereby causing the element to move downwardly away from the fingers 37 to provide the clearance necessary for the ends of the U-bolts 16 just forward of the axle 21.

It will be seen that this clearance is provided while the attached end of the element 7 remains at the level of or even above the lower face of the axle 21. Thus the stabilizer, in normal operation of the vehicle, has no parts extending downwardly below the axle, materially reducing the normal road clearance.

I claim as my invention:

1. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle and in contact therewith to form a fulcrum, and means secured to the remaining end of said second element at the end thereof and extending inwardly for rigidly attaching said second element to the axle, said last mentioned means providing a new fulcrum and increasing the effective length of said second element during abnormal flexing of the spring.

2. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle and in contact therewith to have a first point about which the stabilizer fulcrums during normal flexings of the spring, and means carried by the remaining end of said second element for rigidly attaching the same to the axle, said last mentioned means providing a second point about which the stabilizer fulcrums during abnormally large flexing of the spring.

3. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle, and means for rigidly attaching the remaining end of said second element to the axle secured to the end of said second element to provide a point of support spaced longitudinally of the vehicle with respect to the axle.

4. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle, and means for rigidly attaching the remaining end of said second element to the axle secured to the end of said second element to provide a point of support spaced longitudinally of the chassis with respect to the axle, said last mentioned means including a part urging said second element downwardly away from the axle.

5. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle, and means for rigidly attaching the remaining end of said second element to the axle comprising clamping means for engaging the axle and means projecting laterally from said clamping means and secured to the end of said second element, said laterally projecting means being disposed to tend to flex the free end of said second element downwardly.

6. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle, and means carried by the remaining end of said second element for rigidly attaching the same to the axle with the end of said second element spaced laterally from and above the bottom of the axle.

7. A stabilizer for use with a vehicle having a chassis including a member extending transversely of the chassis, an axle displaced longitudinally of the chassis with respect to the member and spring means interposed between the axle and the chassis, comprising a first leaf element, means on one end of said element adapted for rigid connection to the member with the element extending longitudinally of the chassis in a direction away from the axle, a second leaf element rigidly connected to the remaining end of said first element, said second element being longer than said first element and in the applied condition of the stabilizer extending underneath and beyond the axle, and means carried by the remaining end of said second element for rigidly attaching the same to the axle comprising a pair of cooperating jaws adapted to be clamped onto the axle, one of the jaws having a flange portion extending laterally therefrom and secured to the remaining end of said second element, said flange portion extending at an angle to said jaw such that it tends to direct said second element downwardly and forwardly with respect to the axle.

8. A stabilizer for use with a vehicle having a chassis frame structure, an axle and spring means interposed between the axle and the chassis frame structure, comprising a first element, means carried by one end of said element for rigid attachment to the chassis frame structure, a second element rigid at one end with the free end of said first element and of a length to extend across and beyond the axle when the stabilizer is applied, said elements being flexible in a direction normal to their plane and resisting bending moments in their plane, and means secured to the remaining end of said second element at its end and extending inwardly for rigid attachment to the axle.

9. A stabilizer for use with a vehicle having a chassis including a member extending transversely, an axle and spring means interposed between the axle and the chassis, comprising a first leaf element, a second leaf element substantially longer than said first element and rigidly connected at one end with an end of said first element in a sharp joint, said elements extending transversely of the axle and the transverse member and with their planes generally normal to the relative movement of the axle and member under flexing of the spring means, one of said elements being flexible in a direction normal to its plane, and each of said elements resisting bending moments in its plane, means carried by the remaining end of one of said elements for rigid connection to said chassis member, and means on the remaining end of the other of said elements for rigid connection to the axle, the longer of said elements expending across and beyond both the axle and the member in the applied condition of the stabilizer.

10. A stabilizer for use with a vehicle having a chassis including a frame member extending transversely of the chassis, an axle member displaced longitudinally of the chassis with respect to the frame member and spring means interposed between the axle and the chassis, comprising a first leaf element, a second leaf element rigidly connected to one end of said first element and extending substantially beyond the other end of said first element, said elements extending transversely of the axle and the frame member with their planes generally normal to the direction of relative movement between the axle and the frame member under flexing of the spring, one of said elements being flexible in a direction normal to its plane and both of said elements resisting shear, means carried by the remaining end of said first element for rigid attachment to one of the members, and means carried by the remaining end of said second element for rigid attachment to the other member, said second element in the applied condition of the stabilizer extending across and beyond the member to which it is attached and its attaching means extending inwardly.

11. A stabilizer comprising a first individual leaf element, attaching means secured to one end of said element, a second individual leaf element adapted in the unapplied condition of the stabilizer to extend parallel with said first element, said second element being rigidly and non-pivotally connected to the remaining end of said first element in a joint having a short moment arm and extending substantially beyond the other end of said first element, one of said elements being so highly flexible in a direction normal to its plane as to prevent the stabilizer from performing any load carrying function and each of said elements resisting bending moments in its plane, and attaching means secured to the remaining end of said second element.

12. A stabilizer comprising a first individual leaf element, attaching means secured to one end of said element, a second individual leaf element adapted in the unapplied condition of the stabilizer to extend parallel with said first element, said second element being rigidly and non-pivotally connected to the remaining end of said first element and extending substantially beyond the other end of said first element, one of said elements being so highly flexible in a direction normal to its plane as to prevent the stabilizer from performing any load carrying function and both of said elements resisting shear of the elements, and attaching means for the remaining end of said second element secured at the end of said second element and extending inwardly toward the other end of said second element and terminating in an attaching portion spaced inwardly from the end of the element to which said attaching means is secured.

13. A stabilizer comprising a first leaf element, attaching means secured to one end of said element, a second leaf element rigidly connected to the remaining end of said first element and extending substantially beyond the other end of said first element, one of said elements being flexible in a direction normal to its plane and each of said elements resisting bending moments in its plane, and attaching means for the remaining end of said second element comprising a clamping device and a flange extending laterally of the clamping device and secured to the end of said second element with the clamping device disposed inwardly thereof, said flange forming slightly less than a right angle with the median plane of the clamping device.

14. A stabilizer comprising a first leaf element, attaching means secured to one end of said element, a second leaf element rigidly connected to the remaining end of said first element to overlie the same and extending substantially beyond the other end of said first element, one of said elements being flexible in a direction normal to its plane and each of said elements resisting bending moments in its plane, and attaching means for the remaining end of said second element comprising a member secured at one edge to the end of said second element and extending inwardly at a slight angle to said second element and terminating in means forming a gripping jaw, and a second member adjustably carried by said first mentioned member and forming a complementary jaw.

15. A stabilizer comprising a first leaf element, said element being comparatively wide and relatively thin to be readily flexible in a direction normal to its plane and highly resistant to bending moments in its plane, attaching means secured to one end of said element, a second leaf element longer than said first leaf element, said second leaf element also being comparatively wide and relatively thin to be readily flexible in a direction normal to its plane and highly resistant to bending moments in its plane, and attaching means secured to one end of said second element extending inwardly of the element toward the other end thereof, said elements being normally flat and with their remaining ends in registry and rigidly connected in a joint having a short moment arm normal to the elements to make the stabilizer rigid against relative movement of the ends of the elements carrying the attaching means relative to one another in the direction of the width of the elements.

16. A stabilizer comprising a first individual leaf element, said element being comparatively wide and relatively thin to be readily flexible in a direction normal to its plane and highly resistant to bending moments in its plane, attaching means secured to one end of said element, a second individual leaf element longer than said first leaf element, said second leaf element also being comparatively wide and relatively thin to be readily flexible in a direction normal to its plane and highly resistant to bending moments in its plane, attaching means secured to one end of said second element extending inwardly of the element toward the other end thereof, said elements being normally flat and with their remaining ends in registry, and means rigidly connecting the ends in a joint having a short moment arm normal to the elements to make the stabilizer rigid against relative movement of the ends of the elements carrying the attaching means relative to one another in the direction of the width of the elements.

17. A nonload carrying stabilizer comprising a first leaf element comparatively wide to be highly resistant to bending moments in its plane, attaching means secured to one end of said element, a second leaf element longer than said first leaf element, said second leaf element also being comparatively wide to be highly resistant to bending moments in its plane, one of said elements also being relatively thin to be readily flexible in a direction normal to its plane, and attaching means secured to one end of said second element, said elements being normally flat and with their remaining ends in registry and rigidly connected in a joint having a short moment arm normal to the elements to make the stabilizer rigid against relative movement of the ends of the elements carrying the attaching means relative to one another in the direction of the width of the elements.

18. A nonload carrying stabilizer comprising a first leaf element, said element being comparatively wide and relatively thin to be readily flexible in a direction normal to its plane and highly resistant to bending moments in its plane, attaching means secured to one end of said element, a second leaf element, said second leaf element also being comparatively wide and relatively thin to be readily flexible in a direction normal to its plane and highly resistant to bending moments in its plane, and attaching means secured to one end of said second element, said elements being normally flat and with their remaining ends in registry and rigidly connected in a joint having a short moment arm normal to the elements to make the stabilizer rigid against relative movement of the ends of the elements carrying the attaching means relative to one another in the direction of the width of the elements.

19. A nonload carrying stabilizer comprising a first leaf element comparatively wide to be highly resistant to bending moments in its plane, attaching means secured to one end of said element, a second leaf element, said second leaf element also being comparatively wide to be highly resistant to bending moments in its plane, one of said elements also being relatively thin to be readily flexible in a direction normal to its plane, and attaching means secured to one end of said second element, said elements being normally flat and with their remaining ends in registry and rigidly connected in a joint having a short moment arm normal to the elements to make the stabilizer rigid against relative movement of the ends of the elements carrying the attaching means relative to one another in the direction of the width of the elements.

20. A non-load carrying stabilizer comprising, in combination, a pair of leaf elements one overlying the other and in the unapplied condition of the stabilizer extending substantially parallel with one another, at least one of said elements being so highly flexible in a direction normal to its plane as to prevent the stabilizer from performing any load supporting function, securing means other than said elements rigidly carried on one end of each of said elements for attachment of the stabilizer, and means rigidly and nonpivotally interconnecting the remaining ends of said elements through a frictional connection but with the ends in spaced relation to prevent trapping of foreign particles therebetween.

21. A non-load carrying stabilizer comprising, in combination, a pair of leaf elements one overlying the other and in the unapplied condition of the stabilizer extending substantially parallel with one another, at least one of said elements being so highly flexible in a direction normal to its plane as to prevent the stabilizer from performing any load supporting function, engaging means on one end of each of said elements for attachment of the stabilizer, and means rigidly and nonpivotally interconnecting the remaining ends of said elements in spaced relation including a spacer strip interposed between said elements in tight, frictional relation thereto and a plurality of rivets passing through the elements and the spacer strip.

22. A stabilizer comprising, in combination, a pair of leaf elements each thin, resilient, and wide compared to its length, and with the elements arranged with one of their ends aligned and extending in the same direction and in parallel planes from the aligned ends one overlying the other, means on the remaining end of each of said elements for attachment of the stabilizer, and means rigidly and nonpivotally interconnecting the aligned ends through a frictional connection but with the ends in spaced relation to reduce trapping of foreign particles between the elements.

23. A stabilizer comprising, in combination, a pair of leaf elements each thin, resilient, and wide compared to its length, and with the elements arranged with one of their ends aligned and extending in generally the same direction from the aligned ends one overlying the other, means on the remaining end of each of said elements for attachment of the stabilizer, and means rigidly interconnecting the aligned ends in slightly spaced relation laterally of the plane of the elements including a spacer strip interposed between the elements, a reinforcing strip on the outside of at least one of the elements and rivets passing through the reinforcing strip, the elements and the spacer strip.

24. A stabilizer comprising, in combination, a pair of leaf elements each thin, resilient, and wide compared to its length, and with the elements arranged with one of their ends aligned and extending in generally the same direction from the aligned ends one overlying the other, means on the remaining end of each of said elements for attachment of the stabilizer, and means rigidly interconnecting the aligned ends of the elements comprising a spacer strip interposed between the elements, a reinforcing strip on the outside of each element, and rivets passing through all three strips and both elements.

25. A stabilizer comprising, in combination, a pair of leaf elements each thin, resilient, and wide compared to its length, and with the elements arranged with one of their ends aligned and extending in generally the same direction from the aligned ends one overlying the other, means on the remaining end of each of said elements for attachment of the stabilizer, and means rigidly interconnecting the aligned ends of the elements comprising a spacer strip interposed between the elements, a reinforcing strip on the outside of each element, and rivets passing through all three strips and both elements, each of said strips extending the full width of the elements to produce a frictional connection resisting a shearing force between the elements.

KENNETH E. LYMAN.